(12) United States Patent
Ho-Shing

(10) Patent No.: US 12,319,449 B2
(45) Date of Patent: Jun. 3, 2025

(54) DRONE PROPULSION SYSTEM

(71) Applicant: Colin Ho-Shing, New York City, NY (US)

(72) Inventor: Colin Ho-Shing, New York City, NY (US)

( * ) Notice: Subject to any disclaimer, the term of this patent is extended or adjusted under 35 U.S.C. 154(b) by 86 days.

(21) Appl. No.: 18/113,436

(22) Filed: Feb. 23, 2023

(65) Prior Publication Data

US 2024/0286775 A1    Aug. 29, 2024

(51) Int. Cl.
| | |
|---|---|
| *F16H 37/04* | (2006.01) |
| *B64U 50/19* | (2023.01) |
| *B64U 50/27* | (2023.01) |
| *F16H 37/02* | (2006.01) |
| *F16H 37/06* | (2006.01) |
| *B64U 10/14* | (2023.01) |
| *B64U 50/11* | (2023.01) |

(52) U.S. Cl.
CPC ............. *B64U 50/19* (2023.01); *B64U 50/27* (2023.01); *F16H 37/021* (2013.01); *F16H 37/065* (2013.01); *B64U 10/14* (2023.01); *B64U 50/11* (2023.01)

(58) Field of Classification Search
CPC ........ B64U 50/27; B64U 10/16; B64U 50/11; B64U 50/19; F16H 37/021; F16H 15/16
See application file for complete search history.

(56) References Cited

U.S. PATENT DOCUMENTS

| | | | | |
|---|---|---|---|---|
| 6,042,499 | A | * | 3/2000 | Goi .................... B64C 27/12 |
| | | | | 475/214 |
| 11,572,191 | B1 | | 2/2023 | Allias et al. |
| 2019/0256218 | A1 | | 8/2019 | Correa Hamill |
| 2023/0010644 | A1 | | 1/2023 | Heggen |

OTHER PUBLICATIONS

International Search Report and Written Opinion for International Application No. PCT/US24/16993 dated Jun. 17, 2024.

* cited by examiner

*Primary Examiner* — Derek D Knight
(74) *Attorney, Agent, or Firm* — Foley Hoag LLP; Peter A. Sullivan; Stephen J. Kenny

(57) ABSTRACT

A propulsion system includes a motor, the motor disposed at a center portion of the propulsion system, the motor further including a rotor shaft. The system includes a splitter gearbox coupled to the rotor shaft, the splitter gearbox further comprising at least one splitter output shaft. The system includes at least one continuously variable transmission (CVT), the CVT coupled to the splitter output shaft, the CVTs further including a driveshaft. The system includes at least one bevel gearbox, the bevel gearbox comprising a bevel gearbox input shaft and a bevel gearbox output shaft, the bevel gearbox input shaft disposed parallel to the horizontal plane and the bevel gearbox output shaft disposed at an angle to the bevel gearbox input shaft, wherein the bevel gearbox input shaft is coupled to the driveshaft. The system includes at least one propeller coupled to the bevel gearbox output shaft.

21 Claims, 10 Drawing Sheets

DRONE PROPULSION SYSTEM

BACKGROUND OF THE DISCLOSED SUBJECT MATTER

Field of the Disclosed Subject Matter

The disclosed subject matter relates to a system for a propulsion system. Particularly, the present disclosed subject matter is directed to a propulsion system configured for use with a drone utilizing a continuously variable transmission (CVT).

Description of Related Art

In general, multi-rotor aircraft, of all sizes, but mainly miniature or hobbyist aircraft, are unmanned aerial vehicles (UAVs) that use three or more rotors with fixed-pitch rotors to generate lift. By changing the speed of the rotors so that the thrust generated is greater than, equal to or less than the forces of gravity and drag acting on said aircraft, the drone (aircraft) can be made to ascend, hover or descend. Standard drones, in a quadcopter configuration, utilize four motors mounted on arms or pylons, each a propeller, to create thrust and provide the aircraft with lift. In this configuration, two of the motors rotate counter clockwise and the other two rotate clockwise. This configuration, by nature of the conservation of angular momentum, causes the torque from each motor to cancel out the corresponding propeller rotating the opposite direction. Varying the speed of the counter active rotors will cause the quadcopter to rotate clockwise (CW) or counter-clockwise (CCW) around its axis.

Aircraft are limited in their maximum take-off weight, bounded by thrust capabilities, energy and power storage, as well as propulsion type/configuration. Any aircraft aims to be as light and as powerful as possible. The CVT is the desired transmission type because it has infinite ratios between its minimum and maximum range which is required for smooth precision control of the propeller speed. There thus remains a need for an efficient and economic method and system for a drone propulsion system as described herein.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a propulsion system. The propulsion system includes a motor, the motor disposed at a center portion of the propulsion system, the motor further includes a rotor shaft. The propulsion system includes a splitter gearbox coupled to the rotor shaft, the splitter gearbox further including at least one splitter output shaft. The propulsion system includes at least one continuously variable transmission (CVT), the CVT coupled to the splitter output shaft, the CVTs further including a driveshaft. The propulsion system includes at least one bevel gearbox, the bevel gearbox comprising a bevel gearbox input shaft and a bevel gearbox output shaft, the bevel gearbox input shaft disposed parallel to the horizontal plane and the bevel gearbox output shaft disposed at an angle to the bevel gearbox input shaft and the bevel gearbox input shaft is coupled to the driveshaft. The propulsion system includes at least one propeller, the propeller coupled to the bevel gearbox output shaft.

The disclosed subject matter also includes a propulsion system. A propulsion system includes a motor, the motor disposed at a center portion of the propulsion system, the motor further including a rotor shaft. The propulsion system includes a splitter gearbox coupled to the rotor shaft, the splitter gearbox further including four splitter gearbox output shafts, the splitter gearbox output shafts extending radially from the splitter gearbox at 90 degree intervals and wherein each of the splitter gearbox output shafts are disposed in a horizontal plane. The propulsion system includes four continuously variable transmissions (CVT), each CVT coupled to one of the splitter gearbox output shafts, and wherein each of the CVTs are disposed proximate the splitter gearbox, each CVT further including a driveshaft, wherein, each of the four driveshafts extend radially and collinearly with each of the splitter gearbox output shafts, respectively. The propulsion system includes four bevel gearboxes, each bevel gearbox coupled to one of the driveshafts, the bevel gearbox comprising a bevel gearbox input shaft and a bevel gearbox output shaft, the bevel gearbox input shaft disposed coplanar with the splitter gearbox output shafts and the bevel gearbox output shaft disposed at a right angle to the gearbox input shaft. The propulsion system includes at least four propellers, each of the propellers coupled to one of the bevel gearbox output shafts, each propeller configured to rotate parallel to the horizontal plane about each of the bevel gearbox output shafts.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
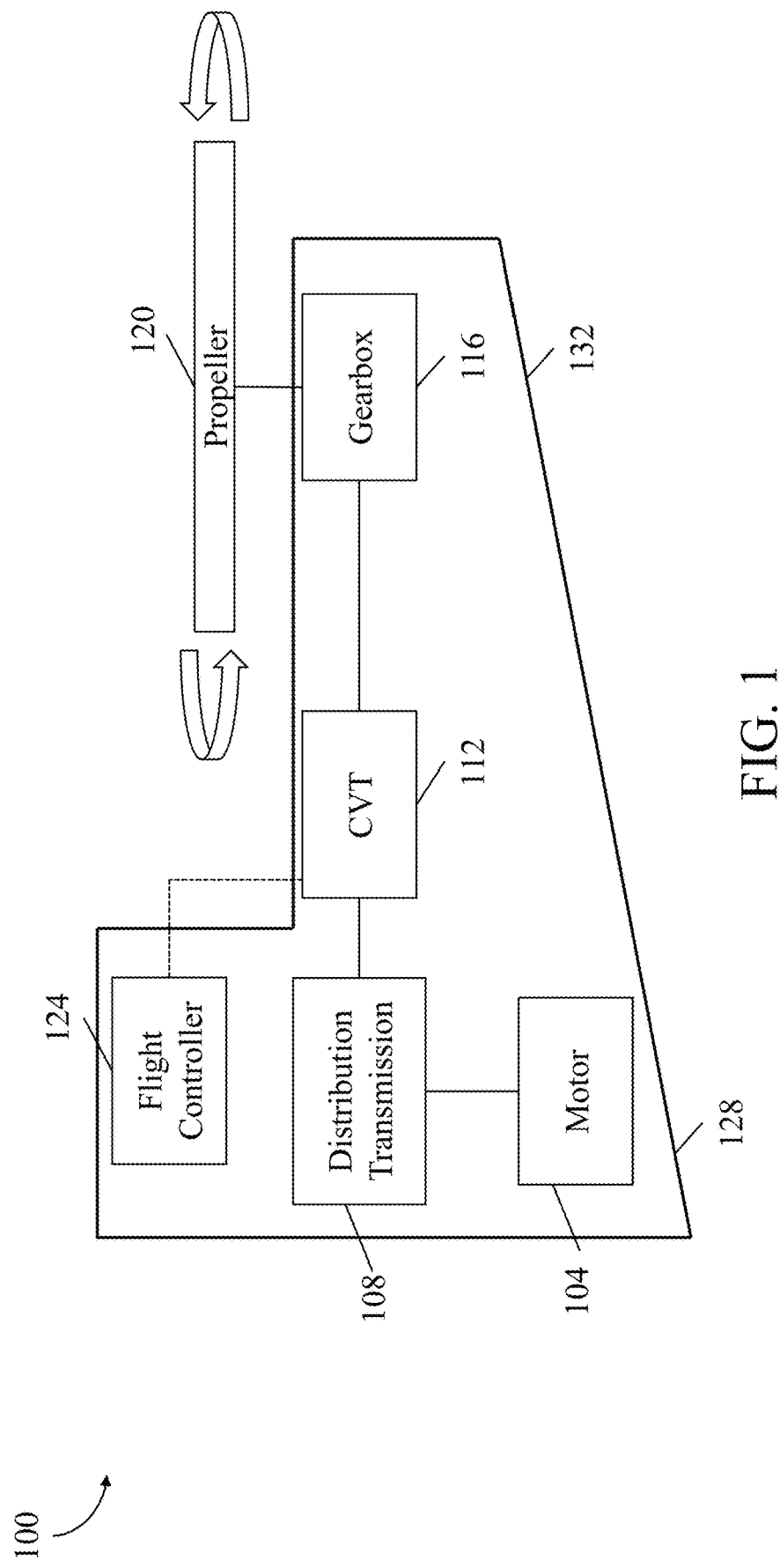
FIG. 1 is a schematic representation of the drone propulsion system in accordance with the disclosed subject matter.

The methods and systems presented herein may be used for a propulsion system. The disclosed subject matter is particularly suited for a propulsion system utilizing a continuously variable transmission configured for use in a drone. For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

Referring now to FIG. 1, a schematic representation of the propulsion system 100 is presented in block diagram form. Note that this schematic diagram is arranged utilizing dashed lines and solid lines. For the purposes of this disclosure, some components may be connected mechanically, electrically, communicatively, or a combination thereof. Both mechanical and electrical or electromagnetic communication may be referenced in this disclosure and any of the components described herein may be connected to any other component in a suitable arrangement.

With continued reference to FIG. 1, system 100 includes a motor 104. Motor 104 includes at least a rotor shaft. Motor 104 may be configured to generate one or more magnetic fields in order to rotate the rotor shaft disposed therein. For example and without limitation, motor 104 may include one or more windings wound upon a stator, the windings configured to be an electromagnet or plurality thereof. Motor 104 may alternate one or more magnetic fields to attract and/or repel one or more permanent magnets affixed to portions of the rotor shaft. In various embodiments, motor 104 may include one or more permanent magnets disposed within or forming the stator disposed about the rotor shaft. The permanent magnet stator may attract and repel portions of an electromagnet (such as windings of conductive material) about the rotor shaft. One of ordinary skill in the art would appreciate that a plurality of arrangements of electric motors may be utilized according to the disclosed subject matter. Motor 104 may be configured to rotate the rotor shaft in both directions (clockwise and counterclockwise) about the rotor shaft's axis (i.e., reversible torque).

With continued reference to FIG. 1, motor 104 may be an electric motor. Motor 104 may be a direct current (DC) and/or an alternating current (AC) electric motor. In various embodiments, motor 104 may be an induction motor, synchronous motor, commutator motor, wound rotor motor and/or squirrel cage motor. In various embodiments, motor 104 may be a shunt motor, series motor, permanent magnet DC (PMDC) motor, compound motor, and/or a separately excited motor. In various embodiments, motor 104 may be a stepper motor, brushless motor, servo motor, universal motor and/or a reluctance motor. In various embodiments, motor 104 may be a brushless electric motor. Motor 104 may be any configuration of components configured to convert electrical energy into rotational or translational motion. In various embodiments, motor 104 may be a brushed motor, single-phase, two, three or more phase, axial, or radial flux motor. In various embodiments, motor 104 may be air-cooled and/or liquid cooled.

With continued reference to FIG. 1, motor 104 may be an internal combustion engine. In various embodiments, motor 104 may be a piston driven combustion engine. In various embodiments, motor 104 may be a Wenkel or rotary engine. In various embodiments, motor 104 may utilize the combustion of one or liquid, vaporized, or gaseous fuels to move one or more components, such as a crankshaft. In various embodiments, motor 104 may be carbureted, fuel-injected, or variable-valve fuel injected. In various embodiments, motor 104 may be a one, two, four, six, eight, ten, twelve or more piston engine. In various embodiments, motor 104 may be a boxer engine, one stroke, two stroke, four stroke, or other configuration engine. In various embodiments, motor 104 may be a circularly-arranged piston-driven engine, wherein the pistons are radially disposed about the crankshaft, and the combustion of fuel in the plurality of pistons cranks the centrally-disposed shaft.

In various embodiments, a plurality of motors may be utilized, the rotor shafts of each of these motors transmitted to a central output shaft for downstream actuation of components. In various embodiments, motor 104 may be disposed at a center portion of the propulsion system 100. Motor 104 may be disposed at the relative center of a radially symmetrical system (as can be readily seen with reference to FIG. 3). Motor 104 may disposed such that the rotor shaft is disposed substantially vertically (perpendicular to the ground, when the system is installed on a drone). In various embodiments, motor 104 may be radially symmetrical itself, the housing that contains the stator, windings, magnets, and rotor shaft including a substantially cylindrical form. In various embodiments, the rotor shaft may be oriented parallel to the ground the in a horizontal plane, the rotor shaft mechanically coupled to one or more other components, as will be discussed herein below. In various embodiments, the rotor shaft may be disposed substantially vertically but oriented downwards (facing the ground when installed on a drone). In various embodiments, the rotor shaft may be disposed about another angle relative to the vertical axis and horizontal plane, such as at a 45 degree angle from vertical and in some radial direction about vertical axis. One of ordinary skill in the art would appreciate the plurality of arrangements of the motor 104 that may be configurable for use with the herein disclosed system.

With continued reference to FIG. 1, system 100 includes splitter gearbox 108. Splitter gearbox 108 may be disposed centrally within system 100, such as above or below the motor 104 at the center of a radially-symmetrical system. Splitter gearbox 108 is configured with one input shaft, the input shaft mechanically coupled to the rotor shaft of motor 104. In various embodiments, the input shaft to the splitter gearbox may be coupled to a collective output shaft that transfers a plurality of motors output rotation into a single output shaft. The splitter gearbox input shaft may include splines, teeth, ridges, gears, or like features configured to mechanically couple said shafts to one another. In various embodiments the input shaft of the splitter gearbox 108 and the output shaft of motor 104 are collinear. In various embodiments the input shaft of the splitter gearbox 108 and the rotor shaft of motor 104 are not collinear. In various embodiments the input haft of splitter gearbox 108 and rotor shaft of motor 104 are disposed at an angle to one another, mechanically coupled by a universal joint or like coupling. In various embodiments, the rotor shaft of motor 104 and the input shaft of splitter gearbox 108 are mechanically coupled to an intermediate component configured to transfer torque between said shafts, such as a gearbox configured to alter the torque transferred between the shafts or the arrangement of shafts relative to one another.

With further reference to FIG. 1, splitter gearbox 108 may be formed as a substantially cubic body. The input shaft may be disposed through a first face of the cube, and the output shafts may be disposed through at least one of the immediately adjacent sides, thereby disposed orthogonally to the input shaft. In various embodiments the splitter gearbox input shaft and the at least one splitter gearbox output shaft are disposed in different planes. In various embodiments the splitter input shaft and the splitter output shaft are disposed normal to one another disposed in the same plane. In various embodiments the splitter input shaft and the splitter output shaft are disposed at an acute angle to one another in the same plane. In various embodiments the splitter input shaft and the splitter output shaft are disposed at an obtuse angle to one another disposed in the same plane. In various embodiments the splitter input shaft and the splitter output shaft are disposed normal to one another disposed in a different plane.

In various embodiments the splitter input shaft and the splitter output shaft are disposed at an acute angle to one another while disposed in a different plane. In various embodiments the splitter input shaft and the splitter output shaft are disposed at an obtuse angle to one another while disposed in a different plane. In various embodiments there is a plurality of splitter output shafts, each splitter output shaft disposed radially equidistant from each other, the splitter input shaft intersecting the radial center of the splitter output shafts. In various embodiments the splitter output shafts are disposed non-regularly radially about the splitter gearbox, wherein the splitter input shaft intersects the radial center of the splitter output shafts. In various embodiments the splitter gearbox 108 is not radially symmetrical, wherein the plurality of splitter output shafts are disposed substantially in the same direction, said direction different than the direction in which the splitter input shaft extends.

With continued reference to FIG. 1, each of the splitter output shafts may include splines, ridges, teeth, or other features configured to assist in the mechanical coupling of said shafts to one or more other components. For example and without limitation, each of the plurality of splitter output shafts may be configured as splined shafts, wherein the shaft includes grooves cut along the length of the shaft a predetermined distance along the shaft. For example and without limitation, a shaft may be connected to one or more shafts via a collar, the collar including features configured to couple to the teeth on the splined shaft. The collar may then be further coupled to another shaft via the same or similar mechanism of interlocking teeth about the exterior of the shaft and the interior of the collar.

With continued reference to FIG. 1, splitter gearbox may include a plurality of splitter output shafts, the plurality of splitter output shafts may rotate in the same or differing directions. For example and without limitation, each splitter output shaft may rotate in an alternating pattern, such as in an embodiment wherein there are four splitter output shafts, each rotating in the opposite direction of the two splitter output shafts directly adjacent on either side. In said embodiment, the four splitter output shafts are disposed normal to one another at 90 degree intervals in the horizontal plane.

With continued reference to FIG. 1, system 100 incudes at least one continuously variable transmission (CVT) 112. CVT 112 is coupled to the splitter output shaft. In embodiments wherein a plurality of splitter output shafts are present, each splitter output shaft may be coupled to a distinct CVT 112. For example and without limitation, splitter output shafts may be relatively short, such that each CVT 112 is coupled proximate to the splitter gearbox 108. In various embodiments, CVT 112 may be affixed to a face of the splitter gearbox 108, wherein the coupling from splitter output shaft to the CVT 112 is not load bearing and only serves to transfer torque between shafts. In various embodiments, CVT 112 is configured to have an input shaft and a driveshaft. The input shaft of the CVT 112 mechanically coupled to the splitter output shaft.

With continued reference to FIG. 1, CVT 112 is configured to transfer torque from the splitter gearbox 108 to the bevel gearbox 116, which will be discussed in greater detail below. CVT 112 is configured to adjust the torque being transferred continuously, through a plurality of rotating bodies, the rotating bodies including a plurality of surfaces that when mechanically connected by a roller component, can transfer torque in virtually infinite stages of torque ratios. Although a CVT may not use teethed gears per se, the term "gear ratio" would be appreciated by one of skill in the art to mean the ratio of the radii of driving and driven rotating components, the ratio of which directly informs the transfer of torque between the said rotating components. One of skill in the art would appreciate also that a motor powering the system 100, such as motor 104 may operate at a constant or near constant revolutions per minute (RPM) at its rotor shaft, the CVT 112 allowing an infinite amount of gear ratios to thereby change speed and torque transmitted through the system to the eventual output component.

Although various embodiments of CVT 112 will be discussed in greater detail below, there are a plurality of types of CVTs that CVT 112 may embody. One of ordinary skill in the art would appreciate, after review of the disclosure, that any transmission system may be configured for use with the system as described herein. For example, a standard transmission with a distinct set of gear ratios of driven and driving gears may be utilized without departing from the scope of this disclosure. In various embodiments, CVT 112 may be replaced or used alongside any component configured to transmit power from one component to another. The transmission may use one or more gears meshed together of a plurality of ratios of diameters. The transmission may use one or more lubrication systems and control systems consistent with the entirety of this disclosure. There may be any number of transmissions deployed in the herein disclosed system, including those configured for use with a constant speed motor as described above.

In various embodiments, CVT 112 may be a pulley-based CVT. A pulley-based CVT may use a belt, such as a v-belt, which runs between a plurality (usually two) variable-diameter pulleys. The pulleys, in embodiments, may be configured to have two conical components each, the narrow end of each conical component disposed proximate the other, the two conical components fixedly attached to a shaft between them disposed at through the center of each conical component. The space between the two conical components may act as a sheave. For the purposes of this disclosure, a "sheave" is a pulley wheel used for holding a belt, wire, rope, wire rope, or other suitable component incorporated into a pulley. A sheave may have a grooved surface. A sheave may have a valleyed surface between the two conical halves. A sheave may also include an adjustable operating diameter (radius) for use with a belt, such as a v-belt.

The two conical components may be configured to move relative to one another, thereby varying the distance between said conical components. In various embodiments, one of the two conical components is fixed at its position along the shaft, and the second conical component is configured to be passively or actively actuated along the shaft. In various embodiments, both conical components are configured to move along the shaft, thereby varying the distance between them. In various embodiments, the shaft itself may be configured to telescopically or otherwise vary its length, thereby varying the relative distance of the conical components. In various embodiments the v-belt runs between said conical components, contacting each such that the effective radius of the pulley is the distance between the v-belt and the center of the shaft, although no pulley of that exact radius is present. The pulley-based CVT would include another conical halved pulley, such that the changing of one of the two pulleys' radius forces a change in the other pulley's radius (because the v-belt has a constant length).

The radial thickness of the belt is a compromise between the maximum gear ratio and torque. Steel-reinforced v-belts are sufficient for low-mass, low-torque applications like utility vehicles and snowmobiles, but higher-mass and -torque applications such as automobiles require a chain. Each element of the chain must have conical sides that fit the pulley when the belt is running on the outermost radius. As the chain moves into the pulleys the contact area gets smaller. As the contact area is proportional to the number of elements, chain belts require many very small elements. Some CVTs transfer power to the output pulley via tension in the belt (a "pulling" force), while others use compression of the chain elements (where the input pulley "pushes" the belt, which in turn pushes the output pulley). Positively Infinitely Variable (PIV) chain drives are distinct in that the chain positively interlocks with the conical pulleys. This is achieved by having a stack of many small rectangular plates in each chain link that can slide independently from side-to-side. The conical pulleys have radial grooves. A groove on one side of the pulley is met with a ridge on the other side and so the sliding plates are pushed back and forth to conform to the pattern, effectively forming teeth of the correct pitch when squeezed between the pulleys. Due to the interlocking surfaces, this type of drive can transmit significant torque and so has been widely used in industrial applications. One conical component may be fixed to the splitter output shaft and the other conical component may be fixed to the driveshaft, thereby varying the gear ratio between the input and output shafts of the CVT 112.

In various embodiments, CVT 112 may be a ratcheting CVT. A ratcheting CVT may use a series of one-way clutches or ratchets that rectify and sum only forward motion. The on-off characteristics of a typical ratchet means that many of these designs are not continuous in operation (i.e. technically not a CVT), but in practice, there are many similarities in operation, and a ratcheting CVT is able to produce a zero output speed from any given input speed (as per an Infinitely Variable Transmission). The drive ratio is adjusted by changing linkage geometry within the oscillating elements so that the summed maximum linkage speed is adjusted, even when the average linkage speed remains constant. Ratcheting CVTs can transfer substantial torque because their static friction actually increases relative to torque throughput, so slippage is impossible in properly designed systems.

Figure 3:
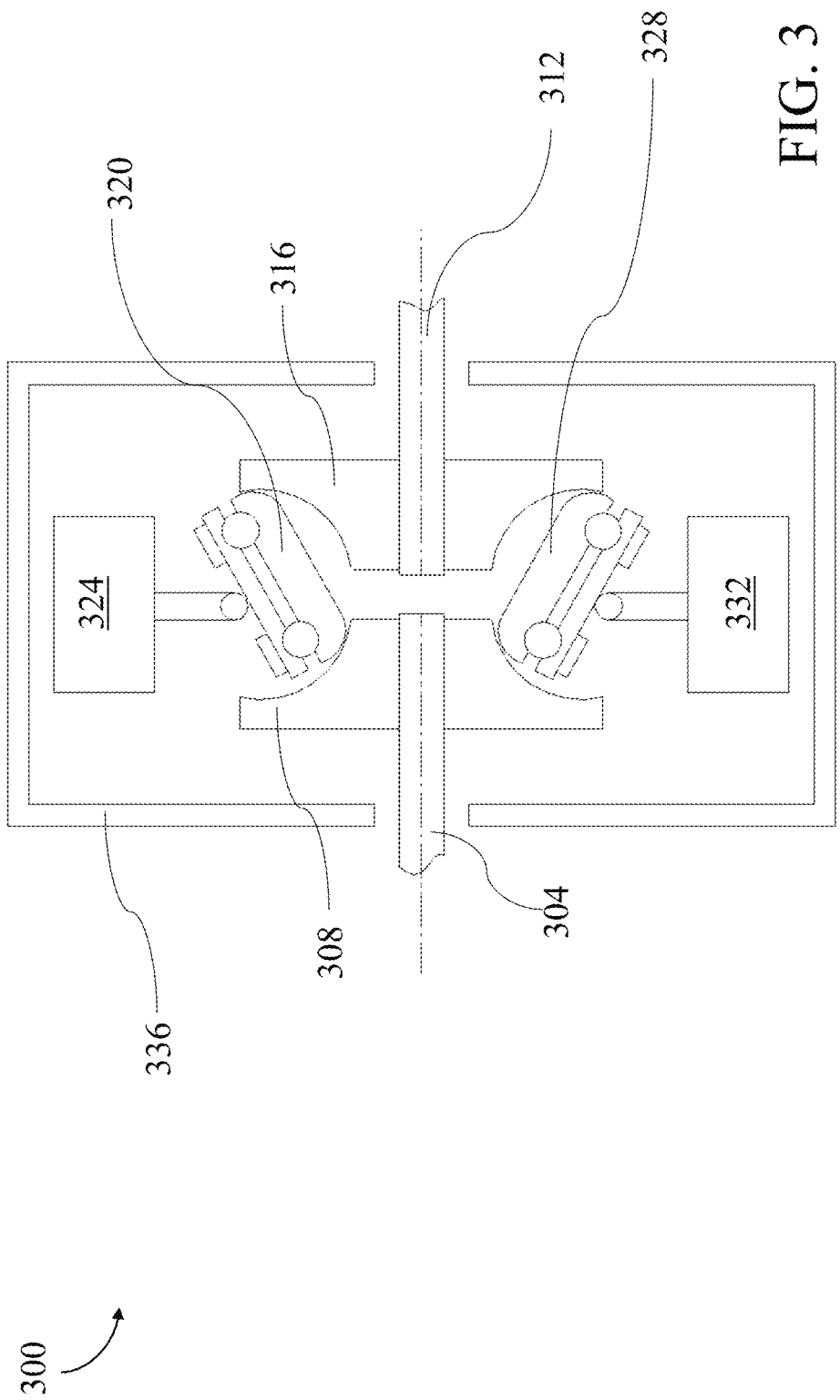
FIG. 3 is a section view of an embodiment of a CVT, in accordance with the disclosed subject matter.

In various embodiments, CVT 112 may be a hydrostatic and/or hydraulic CVT. In various embodiments, CVT 112 may be an electric CVT. The electric CVT may include a power source, a generator, an electric motor, and a battery. The input shaft of the CVT may operate to drive the electric motor to drive an output shaft such as the driveshaft at a certain rpm, the excess energy may be stored by the battery. In various embodiments, CVT 112 may be a cone CVT. The cone CVT may vary the drive (gear) ratio by moving one or more wheels or belts along the axis of rotation of one or more conical rollers. In various embodiments, there may be a plurality of input cones in contact with an output cone, the plurality of cones fixed to the input shaft directly or indirectly. In various embodiments, the CVT may be another type of CVT not described herein, or a combination of CVTs as described herein. In various embodiments the CVT 112 may be a toroidal CVT, an exemplary embodiment of which is shown in FIG. 3.

With continued reference to FIG. 1, system 100 includes at least one bevel gearbox 116. In some embodiments, system 100 includes a plurality of bevel gearboxes 116. In various embodiments, there is a bevel gearbox 116 for each of the driveshafts extending from each of the CVTs 112 disposed within the system 100. Each bevel gearbox 116 includes a bevel gearbox input shaft disposed parallel to the driveshaft to which it is mechanically coupled. In some embodiments, bevel gearbox input shaft may be directly coupled to the driveshaft. In some embodiments, the driveshaft and bevel gearbox input shaft are disposed in a horizontal plane. In some embodiments, the driveshaft and bevel gearbox input shaft are mechanically coupled via an intermediary component, such as an intermediary gearbox, such that the torque from the driveshaft is indirectly transferred to the bevel gearbox input shaft. Bevel gearbox 116 may include one or more bevel gears fixedly attached to the bevel gearbox input shaft at a terminus. In various embodiments, bevel gearbox 116 includes a housing configured to cover the meshing gears and provide bearing locations to support in the bevel gearbox input shaft and bevel gearbox output shaft. In various embodiments, bevel gearbox 116 may include a substantially "L" shaped housing, wherein the bevel gearbox input shaft and bevel gearbox output shaft are disposed 90 degrees from one another in the same plane, terminating within the bevel gearbox 116 housing.

In various embodiments, bevel gearbox 116 transfers torque from the bevel gearbox input shaft to the bevel gearbox output shaft, thereby rotating the output shaft and transferring the direction of rotation. In various embodiments, bevel gearbox 116 is configured to receive torque from the driveshaft into the bevel gearbox input shaft which is disposed substantially in the horizontal plane. The bevel gearbox output shaft transfers torque from the input shaft to the output shaft such that the bevel gearbox output shaft rotates about an axis disposed at some angle compared to the horizontal plane. In various embodiments the bevel gearbox output shaft is disposed normal to the horizontal plane. In various embodiments the bevel gearbox output shaft is disposed at an acute angle to the horizontal plane. In various embodiments the bevel gearbox output shaft is disposed at an obtuse angle to the horizontal plane.

Bevel gears are gears where the axes of the two shafts intersect and the tooth-bearing faces of the gears themselves are conically shaped. Bevel gears are most often mounted on shafts that are 90 degrees apart, but can be designed to work at other angles as well. The pitch surface of bevel gears is a cone, known as a pitch cone. Bevel gears transfer the energy from linear to vertical power, making it very useful in machines widely used in mechanical settings.

Two important concepts in gearing are pitch surface and pitch angle. The pitch surface of a gear is the imaginary toothless surface that you would have by averaging out the peaks and valleys of the individual teeth. The pitch angle of a gear is the angle between the face of the pitch surface and the axis.

Bevel gearbox 116 may include two or more external bevel gears. This type of bevel gear is called external because the gear teeth point outward. The pitch surfaces of meshed external bevel gears are coaxial with the gear shafts; the apexes of the two surfaces are at the point of intersection of the shaft axes, disposed proximate to the corner of the "L" shape bevel gearbox housing 116. In various embodiments, bevel gearbox 116 includes crown gears. Bevel gears that have pitch angles of exactly 90 degrees have teeth that point outward parallel with the axis and resemble the points on a crown. In various embodiments, bevel gearbox 116 includes mitre gears. Mitre gears are a special case of bevel gears that have equal numbers of teeth. The shafts are positioned at right angles from each other, and the gears have matching pitch surfaces and angles, with a conically-shaped pitch surface. The cylindrical gear tooth profile corresponds to an involute (i.e. a triangle wave projected on the circumference of a circle), whereas the bevel gear tooth profile is an octoid (i.e. a triangle wave projected on the normal path of a circle of a sphere). In various embodiments, bevel gearbox 116 includes spiral bevel gears. Spiral bevel gears have their teeth formed along spiral lines. The advantage of the spiral tooth over the straight tooth is that they engage more gradually. The contact between the teeth starts at one end of the gear and then spreads across the whole tooth. This results in a less abrupt transfer of force when a new pair of teeth come into play. With straight bevel gears, the abrupt tooth engagement causes noise, especially at high speeds, and impact stress on the teeth which makes them unable to take heavy loads at high speeds without breaking.

With continued reference to FIG. 1, system 100 includes at least one propeller 120. In various embodiments the propeller is coupled to the bevel gearbox output shaft. In various embodiments, the system 100 includes three or more propellers. In various embodiments, the system 100 includes four propellers, the four propellers disposed radially and equidistantly about the center portion of the system. In various embodiments, the four propellers are disposed at the ends of a commensurate amount of arms extending from the center portion of the system. Propeller 120 may be disposed substantially parallel to the horizontal plane. For the purposes of this disclosure, a "propeller" is a component including a central hub with radially extending blades connected thereto, the propeller configured to produce linear lift when rotated through a fluid, such as air, in embodiments. Propeller 120 may be a fixed pitch propeller. In various embodiments, propeller 120 may be a variable pitch propeller.

With continued reference to FIG. 1, system 100 includes a flight controller 124. Flight controller 124 may be disposed proximate the center portion of system 100. Flight controller may include a housing, said housing may be air and/or water tight. The housing may be sealable to dust or moisture ingress. Flight controller 124 may be configured as the flight controller in FIGS. 1 and/or 4. Flight controller 124 may be one or more printed circuit boards (PCB). Flight controller 124 may be one or more computers running simultaneously onboard the system 100. In various embodiments, flight controller 124 may be one or more single-board computers such as Raspberry Pis®, Beagleboards®, Arduinos®, or the like. Flight controller 124 may be communicatively connected to one or more sensors, the one or more sensors configured to detect aircraft, environmental, health, telemetry and other data used to control said aircraft on which system 100 is deployed.

For example and without limitation, motor 104 may be disposed within a main body of a drone, such as drone body 128. Drone body 128 may be configured as a circular, oblong, rectangular, semi-rectangular or otherwise three-dimensional polygonal body. Drone body 132 may be configured to house components of system 100 such as motor 104 and other centrally-located or relatively heavy components such as splitter gearbox 108. Drone body 128 may be configured to house any electronics such as a flight controls or other wiring, transceivers, sensors, or the like. Drone body 128 may be configured to include legs for landing on a flat or uneven surface. Drone body 128 may be configured to include wheels. Drone body 128 may be formed from one or more plastics, composites, metals, or a combination thereof.

Drone body 128 may include one or more arms. For the purposes of this disclosure, "arms" refer to the radially-extending spars on which a propeller is mounted. A drone body 128 may include two arms 132, three, four, five, six, seven, eight, nine, ten, eleven, twelve, or more arms 132. Each arm 132 may include one or more propellers 120, as will be discussed further below.

Figure 2:
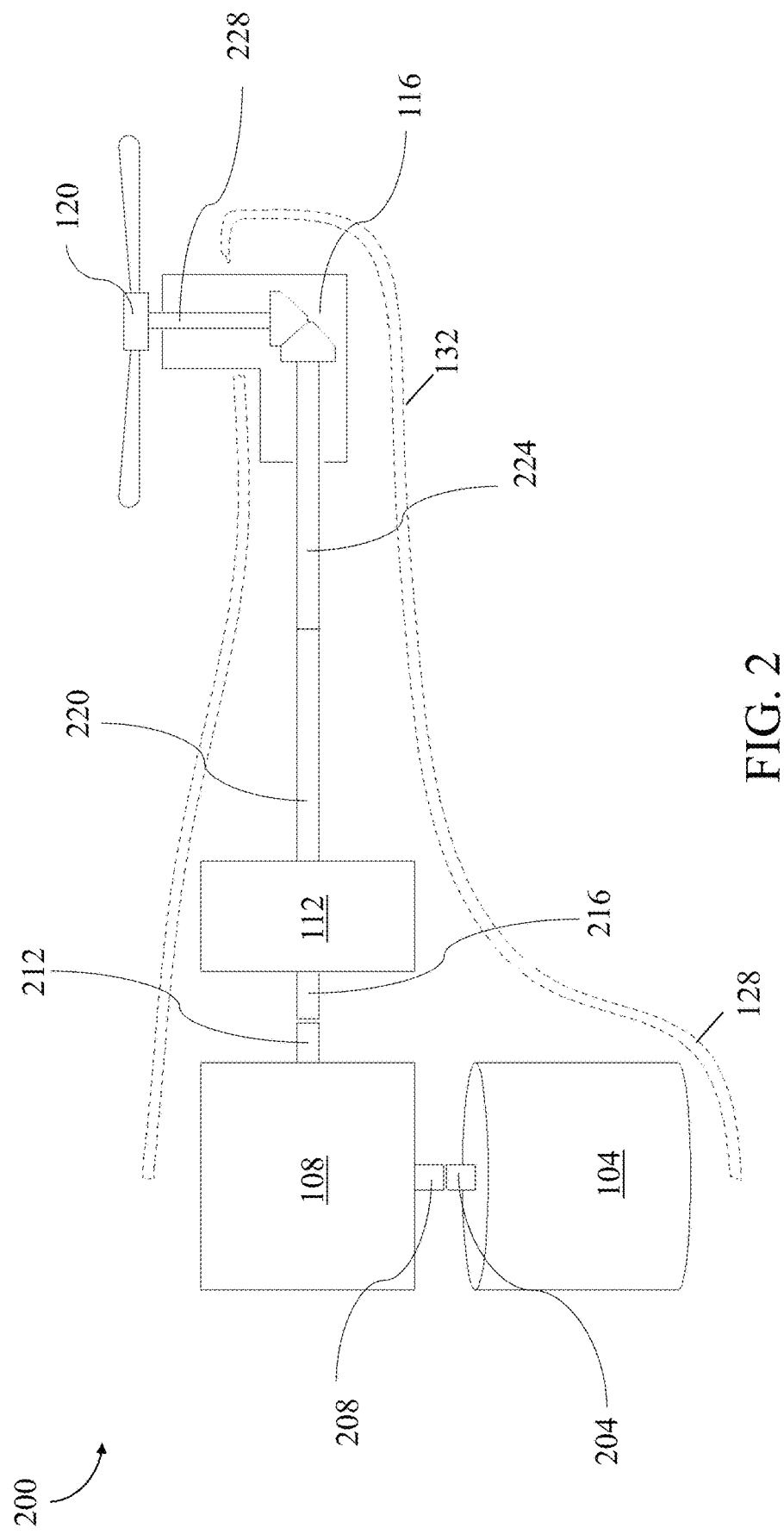
FIG. 2 is an exemplary embodiment of the propulsion system in section view, in accordance with the disclosed subject matter.

Referring now to FIG. 2, a portion of a mutli-copter drone 200 implemented with and embodiment of system 100 is shown in section view. Note that FIG. 2 is a section view of a central portion of the drone and one arm of the drone. In various embodiments, drone 200 may include 3, 4, 5, 6, 7, 8, 9, 10 or more arms consistent with the description of one arm herein. One of ordinary skill in the art would appreciate that the plurality of arms that may be present in drone 200 may in accordance with splitter gearbox 108. Also, the configuration, e.g. size and location, of the various components within the arm can be rearranged as desired such as to reduce arm thickness and provide a more aerodynamic profile. Splitter gearbox 108 may include one splitter output shaft for each arm, in various embodiments. One of ordinary skill in the art would also appreciate that drone 200 may only include one motor 104 and one splitter gearbox 108, but other arrangements of centrally located components may be suitable. A mutli-copter drone 200 may include any of the components, systems, elements and methodologies as described herein. For example and without limitation, drone 200, includes motor 104 as described herein. Motor 104 may be disposed centrally within the drone body 132. Motor 104 may be a relatively heavy component and in order to balance said weight within drone 200, motor 104 may be located at the radial center of drone 200.

With continued reference to FIG. 2, drone 200 includes splitter gearbox 108. Splitter gearbox 108 may be disposed at the radial center of drone 200 and above motor 104, thereby evenly distributing the weight of the relatively large and complicated gearing of splitter gearbox 108. Splitter gearbox 108 may include one or more splitter gearbox input shaft 208 mechanically and rotatably coupled to the rotor shaft 204 of motor 104. Splitter gearbox 108 may include as many splitter gearbox output shafts 212 as necessary for the plurality of arms present in drone 200. Splitter gearbox output shaft 212 is mechanically and rotatably coupled to CVT input shaft 216.

With continued reference to FIG. 2, drone 200 includes CVT 112 as described herein. CVT 112 includes driveshaft 220, rotatably coupled to CVT input shaft 216 as described in reference to FIG. 1, 3, 6A-B or another CVT altogether. Driveshaft 220 is disposed collinearly with splitter gearbox output shaft 212 and CVT input shaft 216, in various embodiments. In various embodiments, driveshaft 220 is disposed non-collinearly with any other shaft herein. In various embodiments, driveshaft 220 is disposed radially from the central portion of drone 200. In various embodiments, driveshaft 220 is indirectly coupled to any other component herein, such as through the use of one or more intermediate gearboxes.

With continued reference to FIG. 2, drone 200 includes bevel gearbox 116 as described herein. Bevel gearbox 116 includes bevel gearbox input shaft 224 disposed parallel to driveshaft 224. Bevel gearbox input shaft 224 is rotatably coupled to driveshaft 220, either directly or indirectly. Bevel gearbox input shaft 224 may be configured to rotate about the same or parallel axis to driveshaft 220. Bevel gearbox 116 is configured to change the direction of rotation with the system as described herein. Bevel gearbox input shaft 224 may be fixed to a first bevel gear disposed within the bevel gearbox 116. The first bevel gear may be meshed with a second bevel gear. The second bevel gear fixed to a bevel gearbox output shaft 228, the bevel gearbox output shaft 228 disposed normal and coplanar with the bevel gearbox input shaft 224. Bevel gearbox 116 may change the direction of rotation by 90 degrees, as depicted in FIG. 2. Bevel gearbox 116 may change the direction of rotation by less than 90 degrees, thereby tilting the bevel gearbox output shaft 228 towards the central portion of drone 200. In various embodiments, bevel gearbox 116 may change the direction of rotation by more than 90 degrees, thereby tilting the bevel gearbox output shaft 228 away from the central portion of the drone 200. Bevel gearbox 116 may include bevel gears suitable for the desired change in shaft direction, such as oblique gears for large angles, and oppositely for smaller angles, in accordance with the description relative to FIG. 1.

With continued reference to FIG. 2, drone 200 includes at least one propeller 120. Propeller 120 may be rotatably coupled to bevel gearbox output shaft 228. Propeller 120 may be configured to rotate about the output shaft axis and provide lift via at least one blade having an airfoil cross-sectional shape.

Referring now to FIG. 3, an embodiment of CVT 112 is shown in schematic section view. One of ordinary skill in the art would appreciate that CVT 112 may be any suitable type of CVT as described herein or another type of CVT not described. FIG. 3 depicts a section view of a toroidal type CVT. Toroidal CVT 300 includes an input shaft 304. The input shaft 304 may be coupled to the rotor shaft of a motor, not depicted for clarity. Input shaft 304 may be directly or indirectly coupled to rotor shaft of the motor 104. Input shaft 304 may be rotatably coupled to rotor shaft of motor 104. Input shaft 304 includes a first conical surface 308. First conical surface 308 is disposed collinearly and radially symmetric about input shaft 304. First conical surface 308 includes a concave conical shape, such that the surface of the first conical surface is curved and radially symmetrical about input shaft 304.

With continued reference to FIG. 3, CVT 300 includes a driveshaft 312. The driveshaft extending collinearly with the input shaft, according to embodiments. In various embodiments, input shaft 304 and driveshaft 312 are disposed in a non-collinear arrangement. Driveshaft 312 includes a second conical surface 316. Second conical surface 316 is disposed opposite of first conical surface 308, the apex of the conical surfaces disposed proximate to one another. First and second conical surfaces 308, 316 are disposed symmetrically, and rotate about the same axis extending between them, in embodiments. In various embodiments, first and second conical surfaces 308, 316 include a gap between them. Second curved surface 316 includes a concave conical shape, the same or similar curvature as first conical surface 308. In various embodiments, first and second conical surfaces 308, 316 include differing curved profiles.

With continued reference to FIG. 3, CVT 300 includes at least one power roller 320. Power roller 320 includes a circular surface, the circular surface included a curved edge portion configured to contact both the first and second conical surfaces 308, 316 simultaneously. Power roller 320 is configured to turn as input shaft 308 turns first conical surface 308. In turn, power roller 320 rotates second conical surface 316 and driveshaft 312. Power roller 320 is configured to contact both the first and second conical surfaces 308, 316 which contacting a first and second circumferences about said conical surfaces, respectively. For example, in FIG. 3, power roller 320 is tilted such that the circumference the contact circumscribes on the first conical surface 308 is less than the second circumference circumscribed on the second conical surface 316 by the power roller 320. The first and second circumferences may be altered by tilting the power roller 320, therefore changing the "gear ratio" between the input shaft 304 and the driveshaft 312. The power roller 320 may be tilted to contact a third and fourth circumference, thereby stepping up or down the infinite "gear ratio" between input shaft 304 and driveshaft 312. The infinite steps of gear ratio attainable by CVT 300 allows motor 104 to output the same RPM at the rotor shaft, but effectively control the driveshaft 312 RPM.

Power roller 320 may be tilted by an actuator such as actuator 324. Actuator 324 may be a stepper motor, servo motor, or the like. Actuator 324 is configured to be controlled according to at least one of a plurality of methodologies. In various embodiments, actuator 324 may be controlled via electronic signals provided by one or more flight controllers. Actuator 324 may be configured such that the flight controller controls the angular position of the servo (actuator 324) which changes the ratio contact points (i.e., circumferences of the CVTs first and second conical surfaces 308, 316, and thus its output speed).

In various embodiments, actuator 324 may be controlled utilizing one or more encoders, such as a mechanical, optical, magnetic, electromagnetic induction, or other type of encoder. Actuator 324 is configured to rotate power roller 320 relative to the first and second conical surfaces 308, 316, thereby changing the gear ratio between the input shaft 304 and driveshaft 316 via the circumferences on the conical surfaces in contact with the power rollers. Power roller 320 may include one or more tensioning components configured to maintain contact with the first and second conical surfaces 316 during rotation at speed. For example and without limitation, power roller 320 may include one or more biasing devices like leaf springs, spiral springs, or the like in order to press the power roller 320 into first and second conical surfaces 308, 316, respectively and simultaneously. Power roller 320 may be formed from one or more high friction materials to reduce or eliminate slippage against the first and second conical surfaces 308, 316.

With continued reference to FIG. 3, CVT 300 may include a second power roller 328. Power roller 328 may be disposed opposite power roller 320. Power rollers 320, 328 may be configured to mirror the rotation of the other, thereby contacting the same circumferences on the first and second conical surfaces 308, 316, rotating oppositely, thereby transferrin the rotation of input shaft 304 to driveshaft 312. Second power roller 328 may be tilted via actuator 332. Actuator 332 may be a servomotor. Actuator 332 may be controlled via the same or similar command signals generated from a flight controller as described herein. Actuator 332 may be controlled via one or more onboard computers as described herein.

Figure 4A:
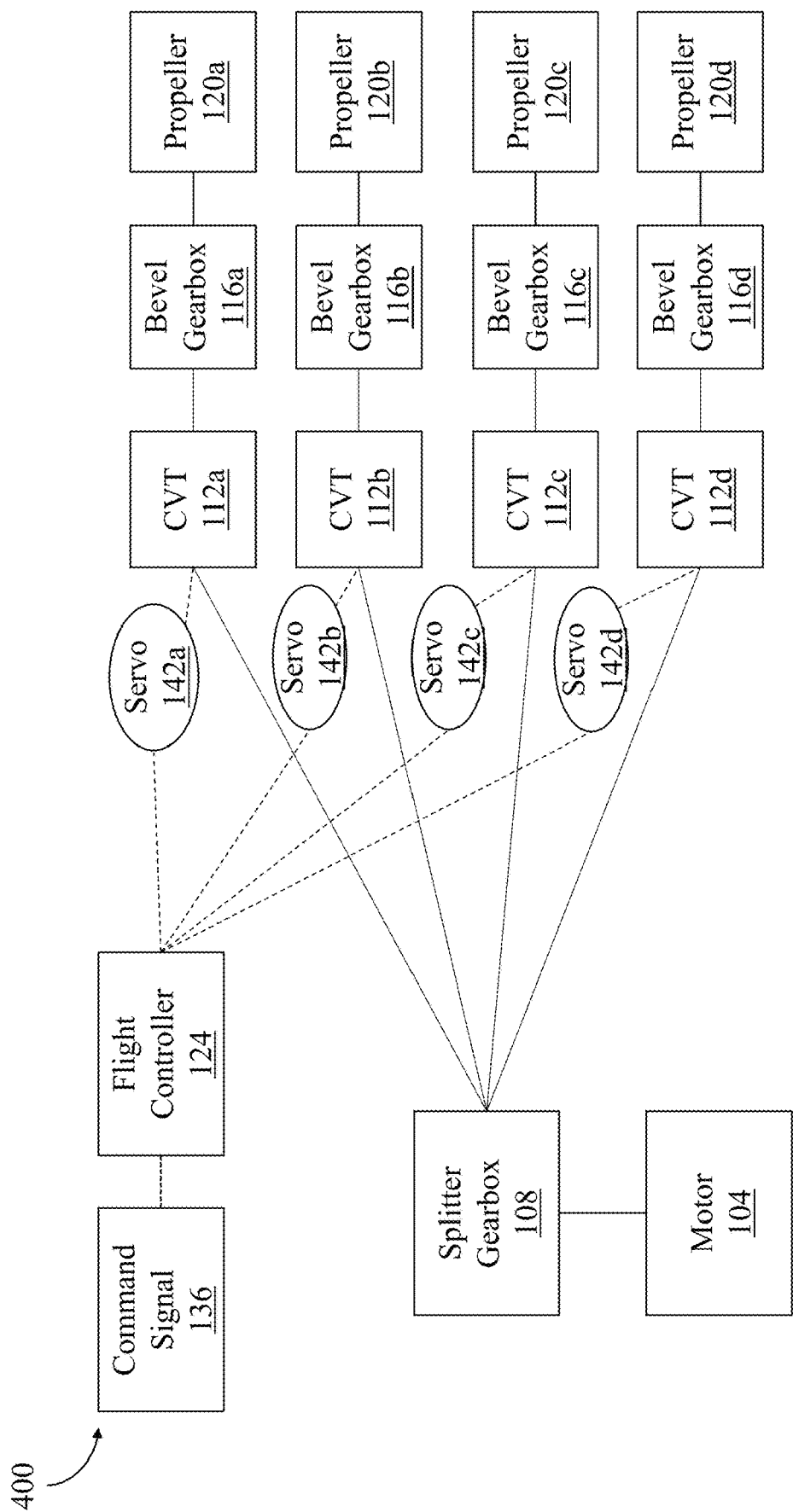
FIGS. 4A-B are schematic representations of the drone propulsion system in accordance with the disclosed subject matter.

Referring now to FIG. 4A, an embodiment of a propulsion system 400 is shown in block diagram form. One of ordinary skill in the art would appreciate that the components present in this system may be the same or similar to the individual components as described in reference to the other figures of this disclosure, namely FIG. 1.

With continued reference to FIG. 4A, system 400 includes motor 104. Motor 104 may be any motor as described herein. Motor 104 may be an electric motor, internal combustion engine, a combination thereof, or another undescribed motor suitable for the application of system 400. Motor 104 may include a rotor shaft such as rotor shaft 204. Rotor shaft 204 may be configured to transfer the rotation generated by the motor to splitter gearbox 108.

Figure 5:
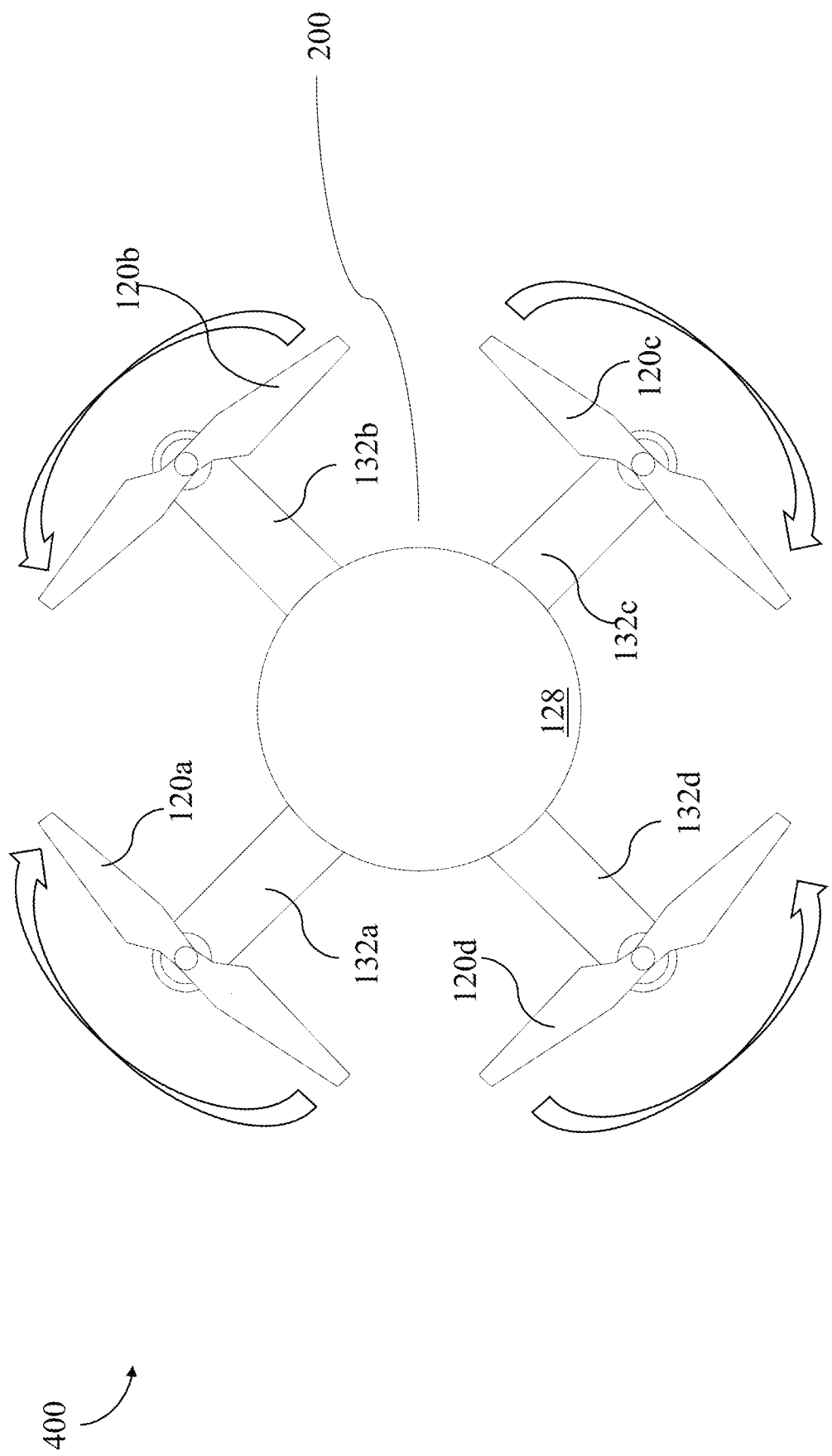
FIG. 5 is a planform view of a multi-copter drone in accordance with aspects of the disclosed subject matter.

With continued reference to FIG. 4A, system 400 includes splitter gearbox 108. Splitter gearbox 108 may include one or more splitter gearbox input shafts, such as gearbox splitter input shaft 208. Splitter gearbox input shaft may be rotatably coupled to the rotor shaft 204. Splitter gearbox 108 includes four splitter gearbox output shafts, similar to or the same as splitter gearbox output shaft 212. Splitter gearbox 108 may include four output shafts disposed 90 degrees radially and in the same plane as one another, as shown in FIG. 5. Splitter gearbox output 108 may include four or more intermediate gearboxes or components configured to transfer rotation from the rotor shaft, through the input shaft of the splitter gearbox, and out to the splitter gearbox output shafts, evenly splitting the rotation amongst the output shafts. Each splitter output shaft is rotatably coupled to one of four CVTs 112a-d. Each splitter gearbox output shaft (212) may be rotatably coupled to the input shaft of a single CVT 112a-d. Each of the CVT 112a-d may be mounted on the splitter gearbox 108. Each CVT 112a-d may be mounted on a distinct face of a housing of splitter gearbox 108. In various embodiments, CVT 112a-d may each include a housing configured to enclose the gearbox and provide one or more mounting portions, such as through-holes, threaded holes, hooks, protrusions or the like.

With continued reference to FIG. 4A, CVT 112a-d may be configured to adjustably transfer rotation from the splitter gearbox output shafts to the driveshafts as described herein. The adjustable transfer of the rotation is accomplished by varying the contact points of one or more power rollers disposed between an input and output conical surfaces attached to the input and output shafts, respectively. Each of the CVTs 112a-d may be rotatably connected to one or more servomotors (servos) 142a-d. The servos 142a-d may be configured to be controlled independently via flight controller 124. Flight controller 124 communicatively connected to each of the servos 142a-d and at least one command signal 136. Command signal 136 may be generated by one or more users, computers, or a combination thereof. Command signal 136 may be transmitted by one or more radio transceivers. Command signal 136 may be received by one or more remotely located receivers disposed communicatively coupled to flight controller 124. CVT 112a-d each include at least one driveshaft extending radially therefrom. The driveshafts are each configured to variably transfer the rotation from the motor 104 rotor shaft 204 to the bevel gearbox 116a-d.

With continued reference to FIG. 4A, system 400 includes four bevel gearboxes 116a-d. Each of the four bevel gearboxes 116a-d are rotatably coupled to one of the four driveshafts extending from CVT 112a-d, respectively. Bevel gearbox 116a-d each include a bevel gearbox input shaft as described herein. The input shaft disposed in the horizontal plane, or parallel thereto. The input shaft may be disposed collinearly with the driveshafts. Bevel gearbox 116a-d may include bevel gearbox output shafts disposed normal and coplanar to the input shafts, thereby changing the direction of the shafts from substantially horizontal to substantially vertical. Bevel gearboxes 116a-d may be configured to transfer rotation from the horizontal plane in the driveshafts extending radially from the CVTs 112a-d, to the vertical orientation, thereby rotating one of the fourth propellers 120a-d. In various embodiments, a first portion of bevel gearboxes 116a-d are configured to rotate a first portion of propellers 120a-d in a first direction, and a second portion of the gearboxes 116a-d are configured to rotate a second portion of the propellers 120a-d in a second direction, wherein the second direction is different than the first direction. In various embodiments, propellers 120a, 120c are configured to rotate clockwise via gearboxes 116a, 116c and propellers 120b, 120d are configured to rotate counter-clockwise via gearboxes 116b, 116d, such as in FIG. 5. The counter-rotation of successive propellers in a four propeller system 400 serves to prevent rotation of the drone 200 as a whole due to the conservation of angular momentum. For example and without limitation, if all propellers were to spin the same direction, such as clockwise, the entire drone 200 would also rotate. It would be noted by one of ordinary skill in the art that the herein disclosed system allows for the individual control of the four propellers individually, and therefore an infinite arrangement of propellers rotating at certain RPMs can be utilized to control the motion of said drone 200.

Figure 4B:
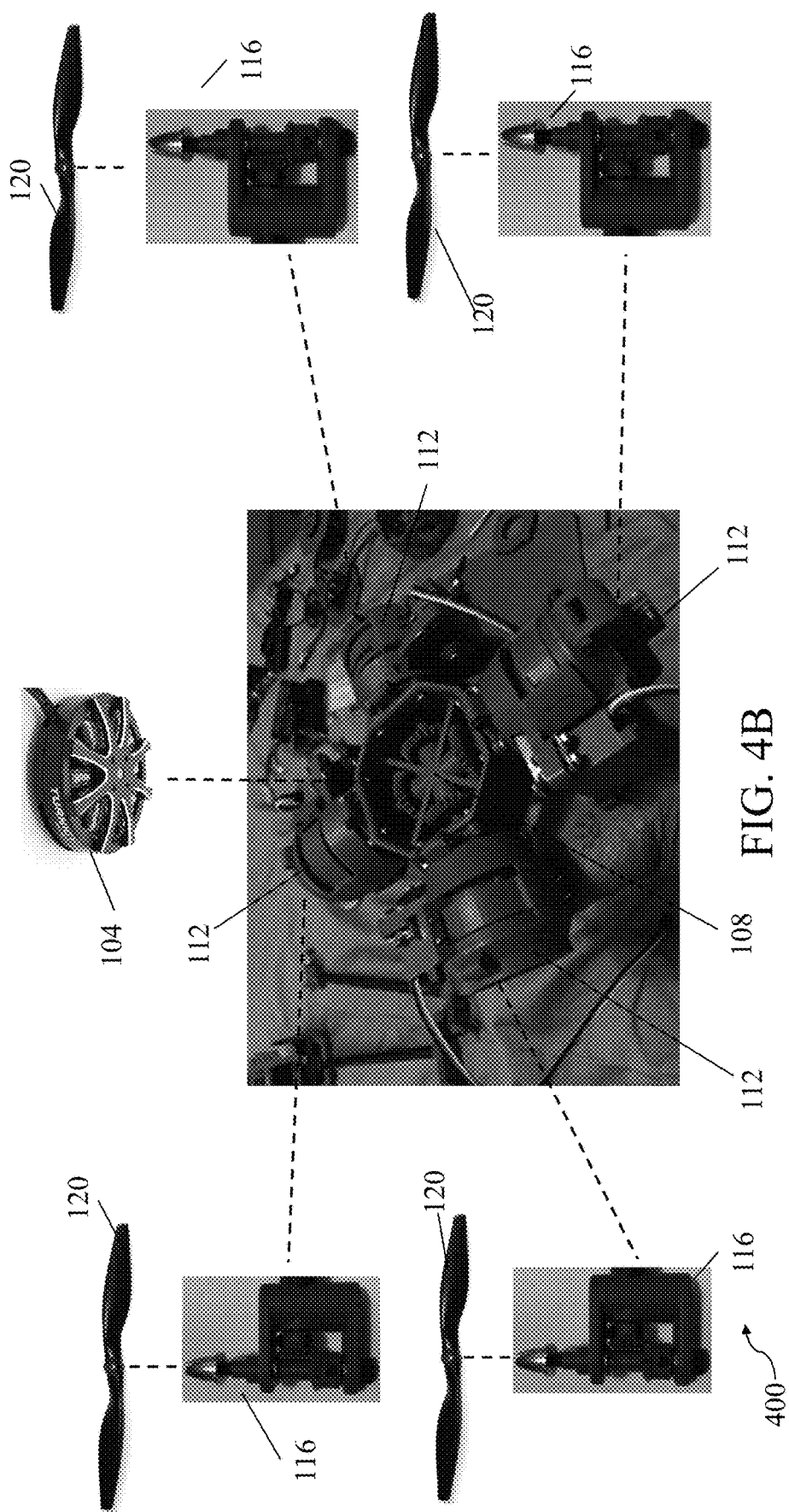

Referring now to FIG. 4B, an illustrative schematic embodiment of propulsion system is shown. One of skill in the art would recognize the representations of the components shown in FIG. 4B are for illustrative purposes only, and the relative arrangement, number of components of each type, and the connection between components do not limit the possible embodiments of system 400.

With continued reference to FIG. 4B, system 400 includes motor 104, shown here as an electric motor disposed at the central portion of the system, motor 104 showing electrically conductive windings through the housing. Motor 104 may be centrally located within system 400 for distributive weight purposes, but may, in various embodiments, be located elsewhere in the system. For example the motor 104 may be disposed on its own arm, or within an arm of a propeller.

With continued reference to FIG. 4B, system 400 includes splitter gearbox 108, splitter gearbox 108 is shown with one input shaft as described herein, and four total output shafts (three visible). The rotations of said input shaft transmitting a torque to each of the four outputs shafts. In various embodiments, the rotation of the input shaft may transmit torque to one or more output shafts in one or both possible directions of rotation.

With continued reference to FIG. 4B, system 400 includes four CVTs 112. The four CVTs 112 may correspond to any of the CVTs 112*a-d* as shown in FIG. 4A. The four CVTs 112 are shown as toroidal CVTs as described herein, but this does not limit the type of CVTs that may be used in system 400. CVTs 112 may include an input shaft and an output shaft, the input and output shafts rotatably coupled by a torque transfer element configured to roll with the input shaft and impart that torque to the output shaft, the angle of the torque transfer element creates a gear ratio between the input and output shafts, as described herein.

With continued reference to FIG. 4B, system 400 includes four bevel gearboxes 116 disposed at each arm of the propulsion system 400. Bevel gearboxes 116 may be configured to transfer torque from the CVT output shaft 90 degrees upward towards the propellers 120. Bevel gearboxes 116 may include a different angle such as an oblique angle, acute angle, or a series of turns configured to dispose each of the propellers 120 at an angle other than the input shaft of the bevel gearboxes 116.

With continued reference to FIG. 4B, system 400 includes four propellers 120 affixed to the output shafts of each of the bevel gearboxes 120. Each of the propellers may be configured to rotate in a first or second direction. For example and without limitation, two of the four propellers 120 may be configured to rotate in a first direction, and the other two may be configured to rotate in a second direction. In various embodiments, the propellers 120 may be configured to arrange the common-direction propellers adjacent to each other, or across the arrangement, as shown in FIG. 5. Each of the propellers 120 may be a counter-rotating propeller, as described herein, such that one propeller affixed to the output shaft of the bevel gearbox rotates in a first direction, and a second propeller affixed to the same output shaft and disposed concentrically with the first propeller, rotates in a second direction. In various embodiments, each bevel gearbox may include more than one propeller 120 affixed to one or more output shafts, such as one propeller disposed on a first side of the bevel gearbox and a second propeller disposed on a second side of the bevel gearbox, each propeller driven by the bevel gearbox via one or more output shafts. The propellers in the preceding embodiment may be counter-rotating propellers or may rotate in the same direction, for example and without limitation. This serves to counteract the rotational momentum of the propeller. In such a manner, the counter-rotating propellers may be disposed at each of the arms of the system 400. In various embodiments, the counter-rotating propellers may be arranged at one or more arms of the system 400.

Figure 6A:
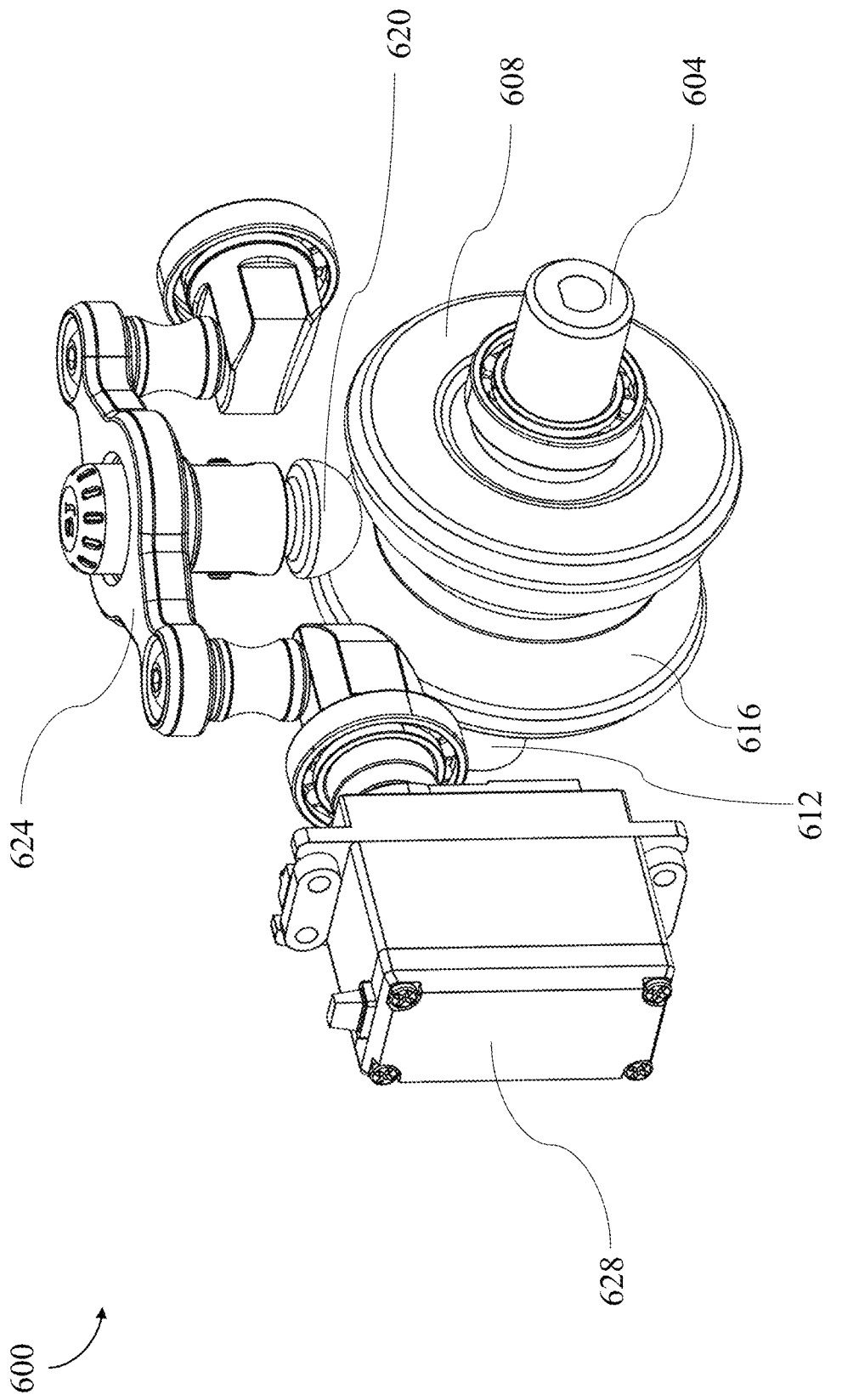
FIG. 6A-C are a front and back isometric view of an embodiment of a CVT, in accordance with the disclosed subject matter.
Figure 6B:
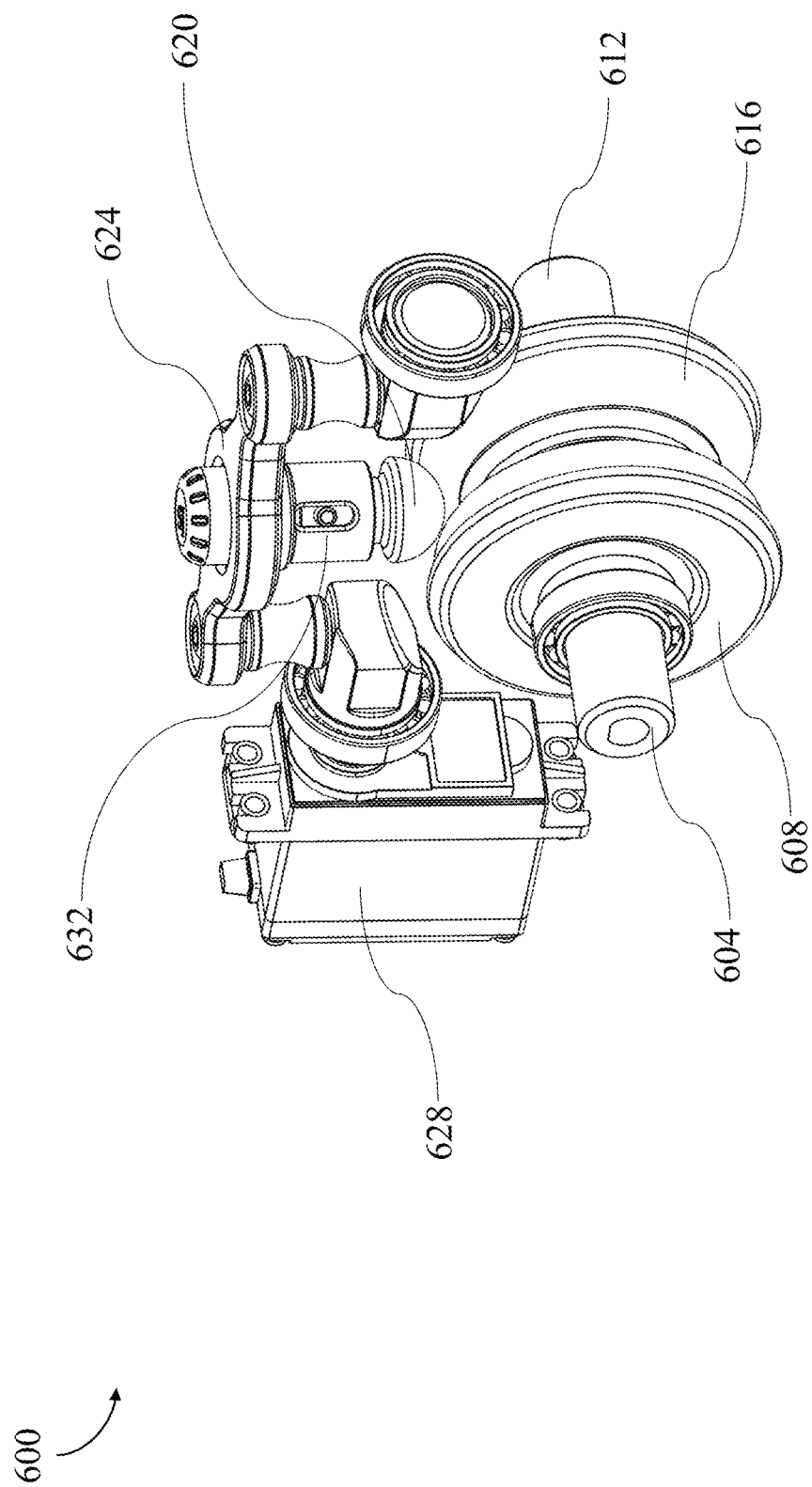
Figure 6C:
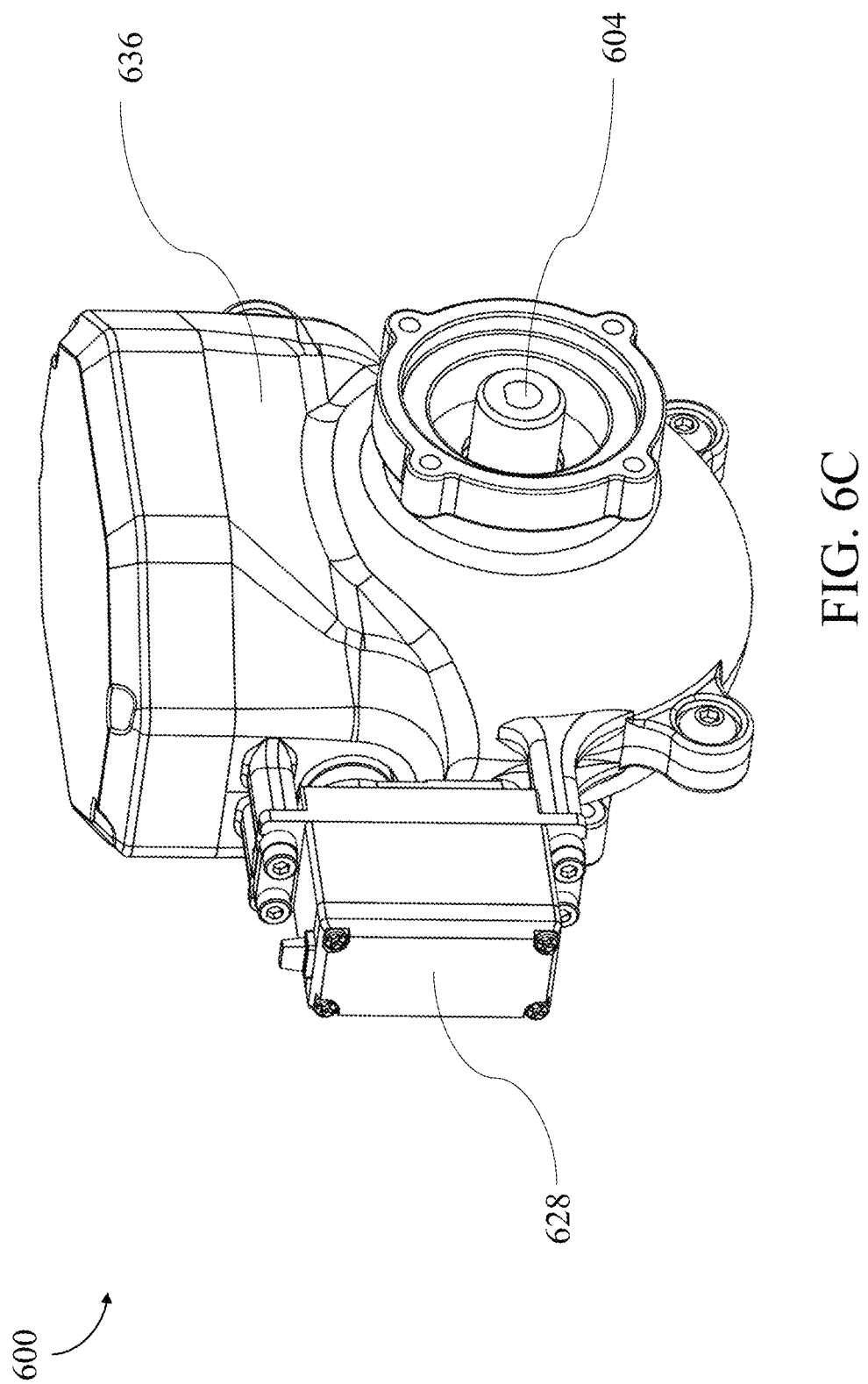

Referring now to FIG. 6A-C, a CVT 600 is shown in front isometric view. CVT 600 may operate similar to the CVT 300 and/or any CVT 112 as described herein. CVT 600 includes CVT input shaft 604. CVT input shaft 604 may be rotatably coupled to one of a plurality of distinct splitter gearbox output shafts. The CVT input shaft 604 may be coupled to said shaft by one or more interlocking features, such as a slot and a tang, a key slot and slotted protrusion, or the like. In various embodiments CVT input shaft 604 may be coupled to a splitter gearbox output shaft via splines disposed along one or both shafts and a toothed collar fixedly coupling the shafts together. CVT input shaft 604 may be disposed collinearly with one or more shafts to which it is directly or indirectly coupled. CVT input shaft 604 is coupled to an input wheel 608. Input wheel 608 may be fixedly coupled to CVT input shaft 604 and configured to rotate rigidly with said CVT input shaft 604. Input wheel 608 may be fixed to CVT input shaft 604 via one or more bearings, such as a ball bearing, sleeve bearing, or the like. CVT input shaft 604 may include one or more cutouts comprising circumferentially disposed teeth, said the configured to mate with a plurality of splines disposed on the CVT input shaft 604. In various embodiments, the input wheel 608 may be formed from metal, composites, plastics, or the like. For example, input wheel may be formed from a plurality of steel alloys. For example, input wheel 608 may be formed from aluminum. For example, input wheel 608 may be formed from additive manufacturing techniques such as 3D printing. In various embodiments, input wheel 608 may be formed substantially from a first material, such as machined aluminum, wherein the outermost edge of the input wheel 608 may be formed from a rubber, or include the application of rubber thereto. The rubber disposed on the edge of input wheel 608 may be configured to prevent slippage between said wheel and rotating components contacting it.

With continued reference to FIG. 6A-C, CVT 600 includes a driveshaft 612. Driveshaft 612 may be the same or similar to any driveshaft as described herein. Driveshaft 612 may be fixedly coupled to an output wheel 616. The driveshaft 612 and output wheel 616 may be configured to rotate at the same rate. In various embodiments, the driveshaft 612 may be configured to rotate at a different rate than output wheel 616, the two components indirectly linked by an intermediate gearbox as described herein. The output wheel 616 is disposed opposite and facing the input wheel 608, the input shaft 604 and driveshaft 612 may be disposed collinearly. Output wheel 616 may be formed in the same or similar manner as input wheel 608. Output wheel 616 may be fixed to driveshaft 612 in the same or similar manner as input wheel 608 to input shaft 604. Output wheel 616 and input wheel 608 may be substantially parallel and configured to rotate in parallel planes to one another. Output wheel 616 and input wheel 608 define a space therebetween, the space spanning the distance from the outermost edge of input and output wheels 608, 616. In various embodiments, each of the input wheel 608 and the output wheel 616 include at least one tensioning component (not pictured). The tensioning component may be configured to align and support one or both of the input wheel 608 and the output wheel 616 during their rotation and/or against possible deflection from the force exerted on the wheel from TTC 620. The one or more tensioning components may be configured to maintain a suitable spacing between input wheel 608 and output wheel 616. The one or more tensioning components may include one or more springs such as a spiral spring, leaf spring, radial, or combination thereof. The one or more tensioning components may include one or more bearings such as a ball bearing, sleeve bearing, torsion bearing, deep groove bearing, angular contact bearing, self-aligning bearing, cylindrical bearing, full complement cylindrical roller bearing, needle roller bearing, tapered bearing, or the like.

With continued reference to FIG. 6A-C, CVT 600 includes torque transfer component (TTC) 620. TTC 620 is rotatably disposed at least partially between input wheel 608 and output wheel 616. TTC 620 may be disposed proximate the edge of input wheel 608 and output wheel 616. In various embodiments, TTC 620 may be disposed proximate the axis of rotation of one or both of input wheel 608 and output wheel 616. In various embodiments, TTC 620 may be disposed at the outermost edges of input wheel 608 and output wheel 616. TTC 620 is configured to contact a portion of input wheel 608 and output wheel 616 simultaneously. TTC 620 may be configured to contact an equally-sized portion of input wheel 608 and output wheel 616 simultaneously. TTC 620 may be configured to contact differently-sized portions of input wheel 608 and output wheel 616, respectively and simultaneously. TTC 620 may be configured to contact differing portions of each of the input wheel 608 and output wheel 616 over time. TTC 620 may be formed from metal, composites, plastics, or a combination thereof, in various embodiments.

Still referring to FIG. 6A-C, TTC 620 may form at least a portion of a spherical profile. In various embodiments, TTC 620 is a hemisphere, the apex of the hemisphere disposed toward the input wheel 608 and output wheel 616 space. In various embodiments TTC 620 includes a full or partially full spherical shape, wherein the equidistant radius defining the sphere extends past the midpoint, where a hemisphere would terminate. In various embodiments, TTC 620 is an oblong curved shape, the oblong curved shape radially symmetrical about the vertical axis running through its center in FIG. 6A (shown for orientation only, axis not included for clarity). In various embodiments, TTC 620 is a three-dimensional shape including a plurality of arcs, not just a continuous arcuate surface as found in a sphere. In various embodiments, TTC 620 is another radially symmetrical shape with a substantially circular cross-section, configured to rotate due to friction from input wheel 608. In various embodiments, TTV 620 is formed from rubber or another non-slip material, configured to produce a suitable friction between input wheel 608, TTC 620, and output wheel 616, in turn.

With continued reference to FIG. 6A-C, TTC 620 is configured to tilt in an arcuate path within the space between the input wheel 608 and output wheel 616. TTC 620 may be configured to tilt in the direction parallel to the input shaft 604 and driveshaft 612. The tilt of TTC 620 in turn alters the circumference of the profile contacting both the input wheel 608 and output wheel 616. For example and without limitation, when the TTC 620 is in a "direct drive" position, the TTC 620 is substantially parallel to the wheel orientation. The circumference of the spherical profile of TTC 620 contacting both the input wheel and output wheel 616 would therefore be the same length. When TTC 620 tilts toward one of the wheels, the circumference in the direction of tilt increases and the circumference in contact with the wheel opposite the direction of tilt decrease. Since the input wheel 608 rotates the TTC 620 and the TTC 620 in turn rotates the output wheel 616, the effective gear ratio between input and output wheels is altered due to the differing circumferences circumscribed by each of the wheels on the TTC 620. In various embodiments, the profile of TTC 620 may be configured such that the circumference contacting the wheel in the direction of the tilt of TTC 620 decreases and the circumference contacting the opposite wheel increase. One of skill in the art would appreciate that the profile of TTC 620 as well as the shape and sizes of each of the input wheel 608 and output wheel 616 may be configured to manipulate the effective gear ratio as a function of tilt of the TTC 620.

With continued reference to FIGS. 6A-C, TTC 620 may be mounted on rotatable mounting arm (RTA) 624. The RTA 624 may be disposed generally around the circumference of input wheel 608 and output wheel 616 on a side thereof, as shown in FIGS. 6A-B. RTA 624 may be configured to suspend TTC 620 in an optimal position relative to the wheels. RTA 624 may rotate as an assembly, thereby tilting the spherical portion of TTC 620 relative to the edges of the input wheel 608 and output wheel 616. RTA 624 may be coupled to an actuator such as actuator 628. Actuator 628 may be a servomotor, as shown in FIGS. 6A-B. Actuator 628 may be a stepper motor. Actuator 628 may be controlled via one or more computers such as a flight controller consistent with the description herein. In various embodiments, actuator 628, as well as any actuator as described herein, is controlled by a flight controller via pulse width modulation (PWM) signals.

Referring now to FIG. 6B specifically, CVT 600 may include a tensioning component 632 configured to bias the TTC 620 against the input wheel 608 and output wheel 616 simultaneously. Tensioning component 632 may be internal to a column connecting the spherical portion of TTC 620 and RTA 624. Tensioning component 632 may be a spiral spring, wherein a first end of the spring is disposed at the interior of the spherical component and the second end of the spring is disposed at the RTA 624, the tension in the spring serving to extend the spherical portion away from the RTA 624, thereby pressing the spherical portion against the wheels simultaneously. As the RTA 624 rotates, the tensioning component 632 may expand or contract to contact the input wheel 608 and output wheel 616 through the entire arc of the RTA 624 rotation, specifically, the rotation of the spherical portion of the TTC 620.

Referring specifically to FIG. 6C, CVT 600 includes a CVT housing 636. CVT housing 636 may be formed from plastic, metal, composites, or the like. Housing 636 may be configured to prevent the ingress of dust and contaminants into the contacting surface of the components of CVT 600. CVT housing 636 may be fastened closed via one or more mechanical fasteners such as screws, nails, pegs and the requisite holes suitable for use thereof. CVT housing 636 may include hardware configured to mount CVT 600 to one or more portions of the system 400, such as to one or more portions of splitter gearbox 108, such as a housing thereof.

Figure 7:
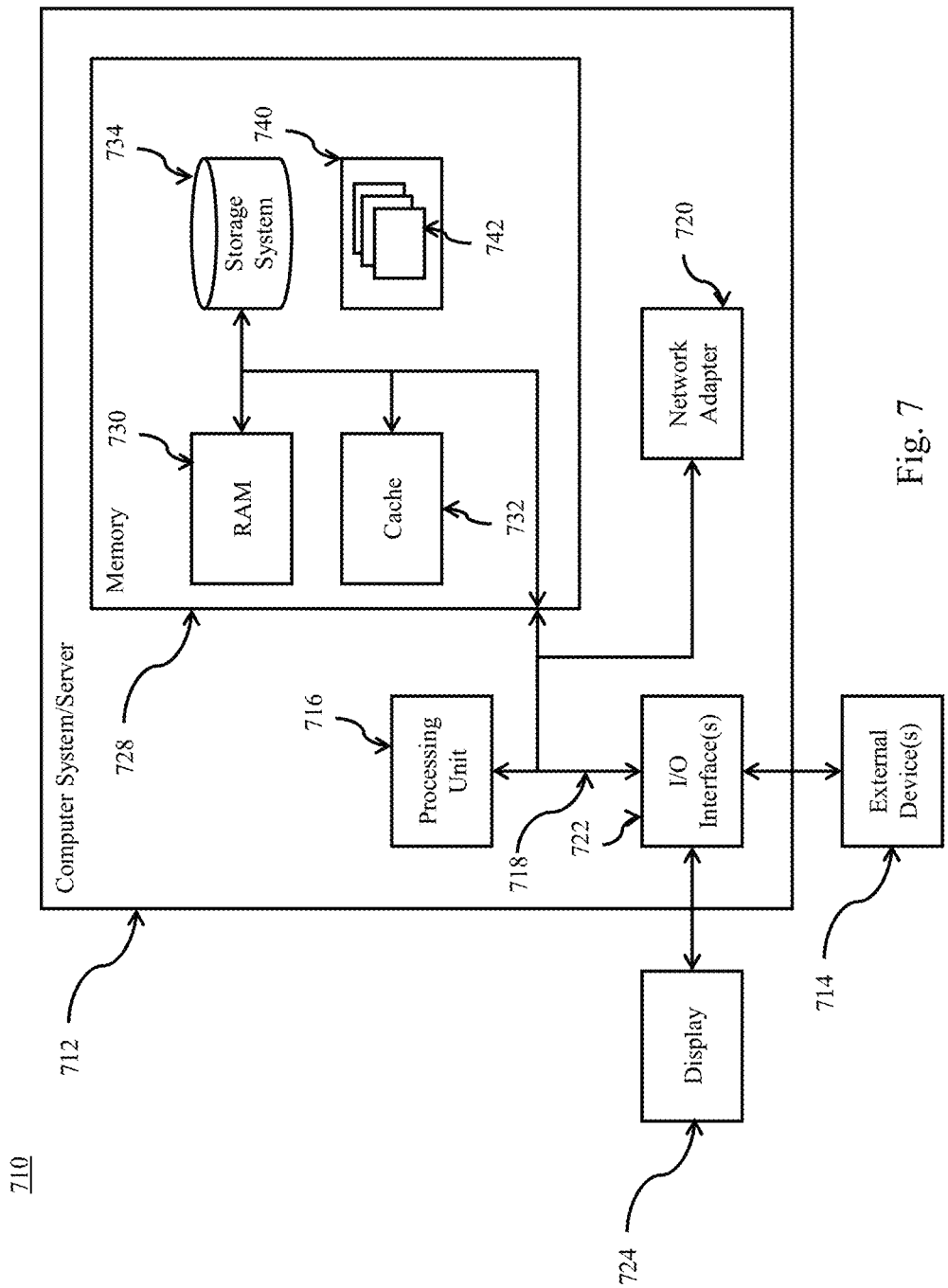
FIG. 7 is block diagram of a computing node in accordance with the disclosed subject matter.

Referring now to FIG. 7, a schematic of an example of a computing node is shown. Computing node 710 is only one example of a suitable computing node and is not intended to suggest any limitation as to the scope of use or functionality of embodiments described herein. Regardless, computing node 710 is capable of being implemented and/or performing any of the functionality set forth hereinabove.

In computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (Pie), and Advanced Microcontroller Bus Architecture (AMBA).

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the disclosure.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A propulsion system, the propulsion system comprising:
    a motor, the motor disposed at a first portion of the propulsion system, the motor further comprising a rotor shaft;
    a splitter gearbox coupled to the rotor shaft, the splitter gearbox further comprising at least one splitter output shaft;
    at least one continuously variable transmission (CVT), the CVT coupled to the splitter output shaft, the CVTs further comprising a driveshaft;
    at least one bevel gearbox, the bevel gearbox comprising a bevel gearbox input shaft and a bevel gearbox output shaft, the bevel gearbox input shaft disposed parallel to a horizontal plane and the bevel gearbox output shaft disposed at an angle to the bevel gearbox input shaft, and
        wherein the bevel gearbox input shaft is coupled to the driveshaft and the driveshaft is collinear with the splitter gearbox output shaft; and
    at least one propeller, the propeller coupled to the bevel gearbox output shaft.

2. The propulsion system of claim 1, wherein the CVT comprises:
    an input shaft coupled to the output shaft of the motor, the input shaft comprising a first conical surface, the first conical surface comprising a concave conical shape collinear with the input shaft;
    a second conical surface coupled to the driveshaft, the second conical surface comprising a concave conical shape collinear with the driveshaft, the second conical surface disposed opposite the first conical surface;
    at least one power roller, the power roller comprising a circular surface rotatably disposed between the first and second conical surfaces, the power roller configured to contact the first and second conical surfaces at a first and second circumference, respectively, wherein:
        the power roller is configured to rotate while in contact with the first and second conical surfaces at the first and second circumferences, respectively.

3. The propulsion system of claim 2, wherein the power roller is rotatably disposed between the first and second conical surfaces and configured to rotate, thereby contacting a third and fourth circumference, respectively.

4. The propulsion system of claim 2, wherein the power roller is coupled to an actuator, the actuator configured to rotate the power roller between the first and second circumferences and the third and fourth circumferences.

5. The propulsion system of claim 4, wherein the actuator is a servomotor.

6. The propulsion system of claim 1, wherein the CVT comprises:

an input shaft, the input shaft coupled to an input wheel, the input wheel configured to rotate with the input shaft;

an output wheel coupled to the driveshaft, the output wheel configured to rotate with the driveshaft, the output wheel disposed parallel and facing the input wheel, defining a spacing therebetween;

a torque transfer component, the torque transfer component rotatably disposed between the input wheel and the output wheel, the torque transfer component comprising at least a portion of a spherical profile, the spherical profile configured to tangentially contact the input wheel and output wheel simultaneously and wherein, the torque transfer component is configured to tilt in an arcuate path within the spacing between the input and the output wheels.

7. The propulsion system of claim 6, wherein the torque transfer component is coupled to a rotatable mounting arm, the rotatable mounting arm further coupled to an actuator, the actuator configured to tilt the rotatable mounting arm.

8. The propulsion system of claim 7, wherein the rotatable mounting arm comprises a tensioning component configured to bias the torque transfer component against the input wheel and the output wheel simultaneously.

9. The propulsion system of claim 8, wherein the actuator is a servomotor.

10. The propulsion system of claim 6, wherein each of the input wheel and output wheel comprise a wheel tensioner component, the wheel tensioner component configured to maintain the spacing of the input wheel and output wheel.

11. The propulsion system of claim 1, wherein the motor is an electric motor.

12. The propulsion system of claim 1, wherein the motor is an internal combustion engine.

13. The propulsion system of claim 1, wherein the propulsion system comprises three or more propellers.

14. The propulsion system of claim 13, wherein the propulsion system comprises four propellers, the four propellers disposed radially and equidistantly about the center portion of the propulsion system.

15. The propulsion system of claim 9, wherein the servomotor is controlled by a flight controller via pulse width modulation (PWM) signals.

16. The propulsion system of claim 8, wherein the tensioning component is a spring.

17. A propulsion system, the propulsion system comprising:
a motor, the motor disposed at a center portion of the propulsion system, the motor further comprising a rotor shaft;
a splitter gearbox coupled to the rotor shaft, the splitter gearbox further comprising:
four splitter gearbox output shafts, the splitter gearbox output shafts extending radially from the splitter gearbox at 90 degree intervals and
wherein:
each of the splitter gearbox output shafts are disposed in a horizontal plane;
four continuously variable transmissions (CVT), each CVT coupled to one of the splitter gearbox output shafts, and wherein:
each of the CVTs are disposed proximate the splitter gearbox, each CVT further comprising a driveshaft, wherein,
each of the four driveshafts extend radially and collinearly with each of the splitter gearbox output shafts, respectively;
four bevel gearboxes, each bevel gearbox coupled to one of the driveshafts, the bevel gearbox comprising a bevel gearbox input shaft and a bevel gearbox output shaft, the bevel gearbox input shaft disposed coplanar with the splitter gearbox output shafts and the bevel gearbox output shaft disposed at a right angle to the gearbox input shaft;
at least four propellers, each of the propellers coupled to one of the bevel gearbox output shafts, each propeller configured to rotate parallel to the horizontal plane about each of the bevel gearbox output shafts.

18. The propulsion system of claim 17, wherein a first portion of bevel gearboxes are configured to rotate a first portion of propellers in a first direction, and a second portion of the bevel gearboxes are configured to rotate a second portion of the propellers in a second direction, wherein the second direction is different than the first direction.

19. The propulsion system of claim 17, wherein each CVT is coupled to a distinct servomotor.

20. The propulsion system of claim 17, wherein each servomotor is configured to be controlled independently.

21. The propulsion system of claim 1, wherein the at least one CVT includes a hydrostatic and/or hydraulic CVT.

* * * * *